United States Patent
Agarwal et al.

(10) Patent No.: US 9,400,546 B1
(45) Date of Patent: Jul. 26, 2016

(54) LOW-POWER IMPLEMENTATION OF TYPE-C CONNECTOR SUBSYSTEM

(71) Applicant: Cypress Semiconductor Corporation, San Jose, CA (US)

(72) Inventors: Rishi Agarwal, Santa Clara, CA (US); Nicholas Alexander Bodnaruk, Sunnyvale, CA (US); Pavan Kumar Kuchipudi, Mangalore (IN); Suresh Naidu Lekkala, Andhra Pradesh (IN)

(73) Assignee: CYPRESS SEMICONDUCTOR CORPORATION, San Jose, CA (US)

( * ) Notice: Subject to any disclaimer, the term of this patent is extended or adjusted under 35 U.S.C. 154(b) by 0 days.

(21) Appl. No.: 14/866,276

(22) Filed: Sep. 25, 2015

Related U.S. Application Data

(60) Provisional application No. 62/182,238, filed on Jun. 19, 2015.

(51) Int. Cl.
  *G06F 3/00* (2006.01)
  *G06F 1/32* (2006.01)
  *G06F 13/362* (2006.01)
  *G06F 13/42* (2006.01)
  *G06F 13/40* (2006.01)

(52) U.S. Cl.
  CPC ............ *G06F 1/3287* (2013.01); *G06F 13/362* (2013.01); *G06F 13/4068* (2013.01); *G06F 13/4282* (2013.01)

(58) Field of Classification Search
  None
  See application file for complete search history.

(56) References Cited

U.S. PATENT DOCUMENTS

| | | | | |
|---|---|---|---|---|
| 6,230,277 | B1* | 5/2001 | Nakaoka | G06F 1/3215 713/310 |
| 6,694,517 | B1* | 2/2004 | James | H04N 7/165 348/E7.063 |
| 7,005,933 | B1* | 2/2006 | Shutt | G06F 1/04 331/111 |
| 2007/0194729 | A1* | 8/2007 | Kraus | H02P 7/29 318/400.1 |
| 2013/0203463 | A1* | 8/2013 | Kent | G06F 1/325 455/556.1 |
| 2015/0022154 | A1* | 1/2015 | Kim | H01M 10/46 320/114 |
| 2015/0212497 | A1* | 7/2015 | Dunstan | G05B 11/01 307/130 |
| 2015/0268688 | A1* | 9/2015 | Leinonen | G05F 3/02 307/147 |
| 2015/0270733 | A1* | 9/2015 | Inha | H02J 7/0054 320/103 |
| 2015/0370299 | A1* | 12/2015 | Waters | G06F 1/266 713/310 |

* cited by examiner

*Primary Examiner* — Elias Mamo

(57) ABSTRACT

Techniques for low-power implementation of a Universal Serial Bus (USB) Type-C connector subsystem are described herein. In an example embodiment, an integrated circuit (IC) chip device comprises a Universal Serial Bus (USB) Type-C subsystem. The Type-C subsystem is configured to operate an Ra termination circuit that consumes no more than 100 μA of current after the Ra termination circuit is applied to a Vconn line of the Type-C subsystem, and/or to operate one or more standby reference circuits in a deep-sleep state of the device to perform detection on a Configuration Channel (CC) line of the Type-C subsystem, where the device consumes no more than 100 μA of current in the deep-sleep state.

18 Claims, 6 Drawing Sheets

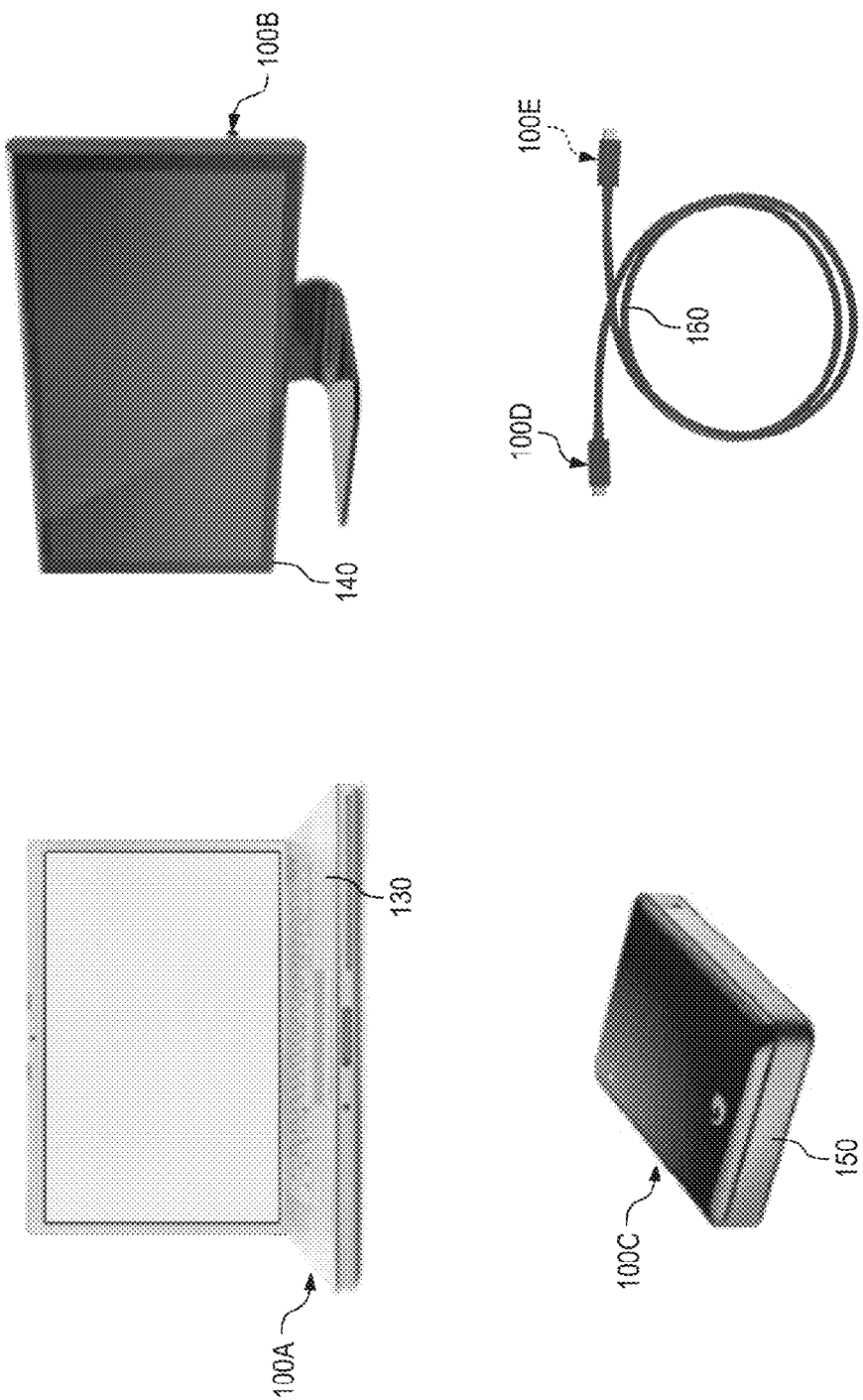

LOW-POWER IMPLEMENTATION OF TYPE-C CONNECTOR SUBSYSTEM

PRIORITY

This application claims the priority and benefit of U.S. Provisional Application No. 62/182,238, filed on Jun. 19, 2015, the entire content of which is incorporated by reference herein.

TECHNICAL FIELD

This disclosure generally relates to Type-C connector subsystems.

BACKGROUND

Various electronic devices (e.g., such as smart phones, cell phones, tablets, notebook computers, laptop computers, desktop computers, hubs, etc.) are configured to communicate through Universal Serial Bus (USB) connectors. A new emerging technology for USB connectors, called USB Type-C, was recently defined in the USB Type-C Specification, Release 1.0 (released on Aug. 11, 2014) and subsequently supplemented in Release 1.1 (released on Apr. 3, 2015). The USB Type-C Specification defines USB Type-C receptacles, plug, and cables that can support USB communication and/or power delivery over older USB protocols (e.g., such as the USB Specification Revision 2.0, released on Apr. 27, 2000, and the USB Battery Charging Specification, Revision 1.2, released on Dec. 7, 2010), as well as newer USB protocols (e.g., such as the USB 3.1 Specification, released on Jul. 26, 2013, and the USB Power Delivery Specification, Revision 2.0, released on Aug. 11, 2014).

While the USB Type-C Specification defines some power requirements (e.g., for USB Suspend mode), it is left to the particular Type-C implementations to manage the overall power consumption of the Type-C subsystems in the particular electronic devices. To this end, however, current USB Type-C implementations are not efficient in their overall power consumption, even though efficient power consumption can enhance the end-user experience and greatly improve the overall operation of Type-C subsystems in both Type-C cables and Type-C enabled USB devices.

BRIEF DESCRIPTION OF THE DRAWINGS

FIG. 1B illustrates example devices that include the IC controller with the Type-C subsystem of FIG. 1A, according to example embodiments.

DETAILED DESCRIPTION

Figure 1A:
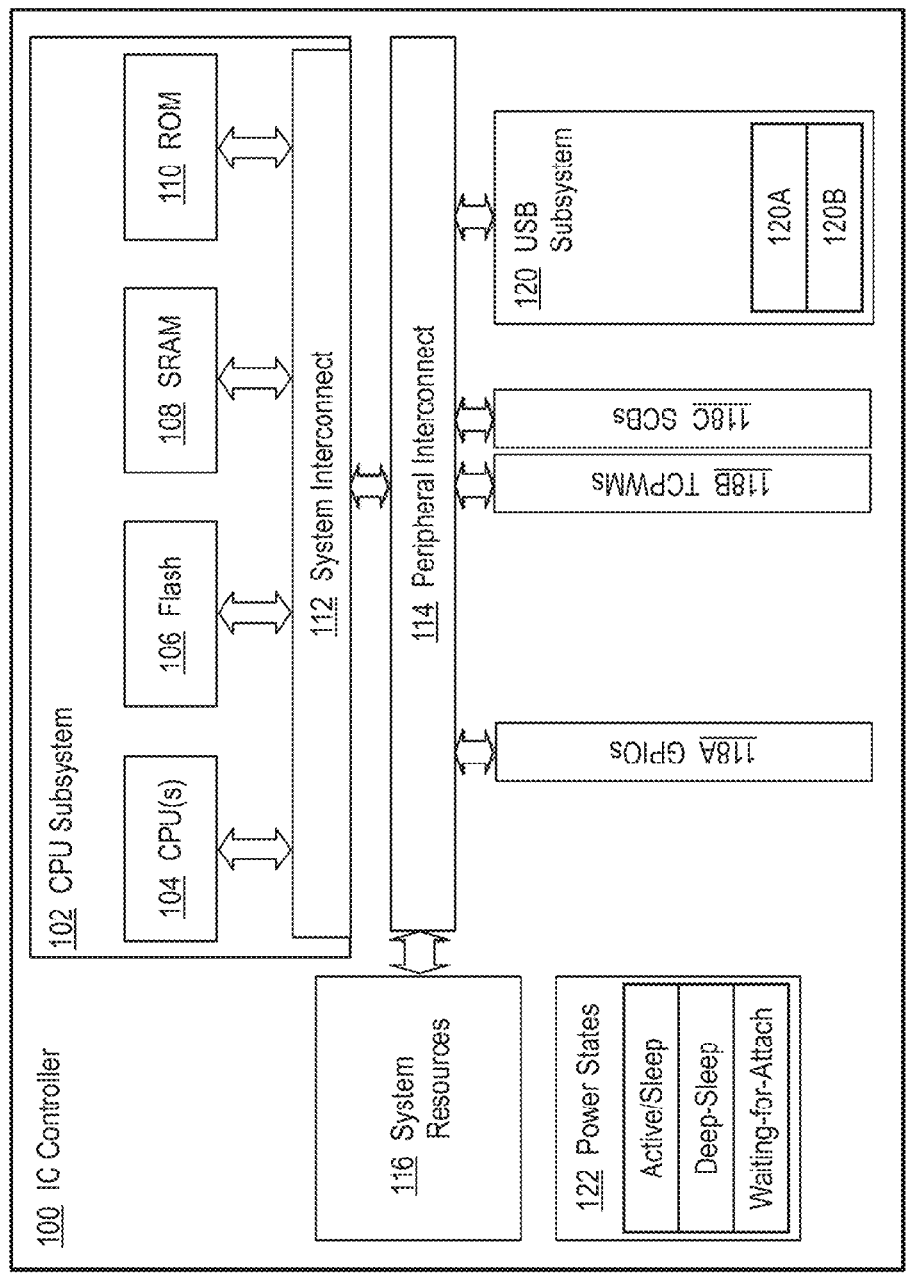
FIG. 1A illustrates an example on-die integrated circuit (IC) controller with a Type-C subsystem in accordance with some embodiments.

The following description sets forth numerous specific details such as examples of specific systems, components, methods, and so forth, in order to provide a good understanding of various embodiments of the techniques described herein for low-power USB Type-C subsystems. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

Reference in the description to "an embodiment", "one embodiment", "an example embodiment", "some embodiments", and "various embodiments" means that a particular feature, structure, or characteristic described in connection with the embodiment(s) is included in at least one embodiment of the invention. Further, the appearances of the phrases "an embodiment", "one embodiment", "an example embodiment", "some embodiments", and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples", are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of techniques for low-power USB Type-C subsystems in electronic devices. Examples of such electronic devices include, without limitation, personal computers (e.g., desktop computers, laptop computers, notebook computers, etc.), mobile computing devices (e.g., tablets, tablet computers, e-reader devices, etc.), mobile communication devices (e.g., smart phones, cell phones, personal digital assistants, messaging devices, pocket PCs, etc.), connectivity devices (e.g., cables, adapters, hubs, docking stations, etc.), audio/video/data recording and/or playback devices (e.g., cameras, voice recorders, handheld scanners, monitors, etc.), and other similar electronic devices that can use Type-C connectors (interfaces) for communication and/or battery charging.

As used herein, an electronic device is referred to as "USB-enabled" if the electronic device complies with at least one release of a Universal Serial Bus (USB) specification. Examples of such USB specifications include, without limitation, the USB Specification Revision 2.0, the USB 3.0

Specification, the USB 3.1 Specification, and/or various supplements (e.g., such as On-The-Go, or OTG), versions and errata thereof. The USB specifications generally define the characteristics (e.g., attributes, protocol definition, types of transactions, bus management, programming interfaces, etc.) of a differential serial bus that are required to design and build standard communication systems and peripherals. For example, a peripheral electronic device attaches to a host device through a USB port of the host device. A USB 2.0 port includes a power line of 5V (denoted VBUS), a differential pair of data lines (denoted D+ or DP, and D− or DN), and a ground line for power return (denoted GND). A USB 3.0 port also provides the VBUS, D+, D−, and GND lines for backward compatibility with USB 2.0. In addition, to support a faster differential bus (the USB SuperSpeed bus), a USB 3.0 port also provides a differential pair of transmitter data lines (denoted SSTX+ and SSTX−), a differential pair of receiver data lines (denoted SSRX+ and SSRX−), a power line for power (denoted DPWR), and a ground line for power return (denoted DGND). A USB 3.1 port provides the same lines as a USB 3.0 port for backward compatibility with USB 2.0 and USB 3.0 communications, but extends the performance of the SuperSpeed bus by a collection of features referred to as Enhanced SuperSpeed.

Some electronic devices may be compliant with a given USB Type-C specification or a specific release thereof (e.g., such the USB Type-C Specification, Release 1.0, the USB Type-C Specification, Release 1.1, or a later release). As used herein, a USB "Type-C subsystem" refers to hardware circuitry that may be controllable by firmware and/or software in an integrated circuit (IC) controller, which is configured and operable to perform the functions and satisfy the requirements specified in at least one release of the USB Type-C specification. Examples of such Type-C functions and requirements may include, without limitation, communications according to USB 2.0 and USB 3.1, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors, etc.

According to the USB Type-C specification(s), a USB Type-C cable is an active cable having one or more integrated circuit (IC) devices disposed therein to define USB Type-C ports at both ends of the cable. In order to support USB communications according to USB 2.0 and USB 3.1, a Type-C port provides VBUS, D+, D−, GND, SSTX+, SSTX−, SSRX+, and SSRX− lines, among others. In addition, a Type-C port also provides a Sideband Use (denoted SNU) line for signaling of sideband functionality and a Configuration Channel (denoted CC) line for discovery, configuration, and management of connections across a Type-C cable. A Type-C port may be associated with a Type-C plug and with a Type-C receptacle. For ease of use, the Type-C plug and the Type-C receptacle are designed as a reversible pair that operates regardless of the plug-to-receptacle orientation. Thus, a standard Type-C connector (interface), disposed as a standard Type-C plug or receptacle, provides pins for four VBUS lines, four ground return (GND) lines, two D+ lines (DP1 and DP2), two D− lines (DN1 and DN2), two SSTX+ lines (SSTXP1 and SSTXP2), two SSTX− lines (SSTXN1 and SSTXN2), two SSRX+ lines (SSRXP1 and SSRXP2), two SSRX− lines (SSRXN1 and SSRXN2), two CC lines (CC1 and CC2), and two SBU lines (SBU1 and SBU2), among others. When the Type-C plug of a cable is attached to a Type-C receptacle, one of the CC lines is connected through the cable to establish signal orientation and the other CC line is repurposed as 5V power line (denoted Vconn) for powering the integrated circuit (IC) device(s) disposed within the Type-C cable.

According to the USB Type-C specification(s), several types of termination circuits are used for identification by USB-enabled host devices, USB-enabled peripheral devices, and USB Type-C cable devices. For example, a host electronic device (e.g., and/or a USB controller thereof) needs to provide an Rp termination circuit ("Rp termination") that includes pull-up resistor element(s) which, when asserted, identify the host device over a Type-C cable. In another example, a peripheral electronic device (e.g., and/or a USB controller thereof) needs to provide an Rd termination circuit ("Rd termination") that includes pull-down resistor element(s) which, when asserted, identify the peripheral device over a Type-C cable. In another example, a Type-C cable device (e.g., an IC controller disposed in a plug of the cable) needs to provide an Ra termination circuit ("Ra termination") that includes pull-down resistor element(s) which, when asserted, identify the IC controller of the Type-C cable to a peripheral and/or a host device connected thereto.

A USB Type-C cable is an active device with one or more integrated circuit (IC) device(s) disposed therein. Thus, when a Type-C cable is in use (e.g., when connected to at least one USB-enabled device), the ICs within the cable consume power. However, because of the complex requirements of the USB Type-C Specification(s), conventional implementations of USB Type-C subsystems (and the transceivers therein) typically keep the ICs within a Type-C cable in an active state, thereby causing the cable to draw a relatively large amount of current (e.g., such as 5 mA, or more). However, drawing a relatively large amount of current (and respectively, power) is generally a disadvantage, especially for battery-powered devices. In addition, conventional implementations of USB Type-C subsystems (and the transceivers therein) typically use external, off-chip components (e.g., such as resistors, capacitors, etc.) to implement various Type-C-required termination and transmit circuits, which requires a bigger chip and further increases the total power used by a Type-C cable when in use.

To address the problem of relatively high power usage and other problems, the techniques for low-power USB Type-C subsystems described herein provide for reducing the IC controller (e.g., system) power when the IC controller is in the attached/detached state and is not actively communicating on the CC line of the Type-C subsystem. For example, the techniques described herein provide for removing/disabling the Ra termination of a Type-C cable when the cable is attached to a USB-enabled device, thereby reducing the power used by the cable in some embodiments. Further, in these and/or other embodiments, the techniques described herein provide a new "waiting-for-attach" state, in which the IC controller in the Type-C cable turns off even the deep-sleep system resources and therefore consumes very low power. In these and/or other embodiments, precise voltage and/or current references are generated by the IC controller in the deep-sleep state that meet all the attach/detach requirements of the USB Type-C Specification(s) in several types of Type-C applications, thereby obviating the need for turning high power consumption active-mode voltage and current references. Example types of Type-C applications include, but may not be limited to: a downstream facing port (DFP) USB application, in which an IC controller with a Type-C subsystem is configured to provide a downstream-facing USB port (e.g., in a USB-enabled host device); an upstream facing port (UFP) USB application, in which an IC controller with a Type-C subsystem is configured to provide an upstream-facing USB port (e.g., in a USB-enabled peripheral device or adapter); a dual role port (DRP) USB application, in which an IC controller with a Type-C subsystem is configured to support both DFP and UFP applications on the same USB port; and an electronically marked cable application (EMCA), in which an IC controller with a Type-C subsystem is configured to provide Type-C ports within a cable device (e.g., an active, Type-C cable, a Vconn-powered accessory, etc.)

In an example embodiment, a device comprises a USB Type-C subsystem. In some aspects of this embodiment, the device is an IC chip that may be disposed into a Type-C cable or another USB application (e.g., such as a hybrid cable, USB-to-TypeC adaptor, Vconn-powered accessory, etc.) The Type-C subsystem comprises a negative charge pump and an Ra termination circuit, where the negative charge pump is coupled to the Ra termination circuit and the Ra termination circuit is coupled to a Vconn line of the Type-C subsystem. As used herein, "negative charge pump" refers to an electronic circuit configured to create a sub-zero voltage power source (e.g., a voltage source in the range of −0.7V to −1.95V, for some implementations). The design of the Ra termination circuit is such that Ra termination is enabled (e.g., is "ON") when the Type-C subsystem is not powered. The Type-C subsystem is configured to enable the negative charge pump when voltage on the Vconn line reaches above a threshold voltage, and disable the Ra termination circuit when the negative charge pump is enabled, where the Ra termination circuit consumes no more than 50 µA of current after being disabled. In an example aspect of this embodiment, the threshold voltage is in a range from 2.375V to 2.625V. In the same or a different aspect, the Ra termination circuit includes a native on-chip device that comprises one or more N-type Metal-Oxide (NMOS) transistors. The native device's transistors have a depletion doping such that the native device has zero or near-zero voltage gate threshold $V_T$ (e.g., the native device turns on its channel when its gate voltage $V_T$ is zero or near-zero, for instance a $V_T$ voltage that is 0V or a lot less 700 mV, for various native device implementations). In an example aspect, the Type-C subsystem is further configured to detect when the voltage on the Vconn line is no longer applied, and disable the negative charge pump in order to enable the Ra termination circuit.

In an example embodiment, a device comprises a USB Type-C subsystem. In some aspects of this embodiment, the device is an IC chip that may be disposed into a Type-C cable or configured in a DFP, UFP, or DRP USB application. In this embodiment, the Type-C subsystem comprises a gate control configured to control Ra termination and a negative charge pump coupled to the gate control such that when enabled/activated, the negative charge pump is configured to disable the Ra termination. The coupling of the negative charge pump to the gate control of the Ra termination circuit ensures that the Ra termination may be disabled (e.g., turned "OFF") when it is no longer needed for identification (e.g., in order to reduce power consumption). In an example aspect of this embodiment, the Ra termination is implemented in a native on-chip device that comprises one or more N-type Metal-Oxide (NMOS) transistors, where the native device has a zero or near-zero voltage gate threshold. In the same or another example aspect, a total current consumed by the Type-C subsystem is equal to or less than 50 µA when the Ra termination is disabled. In some example aspects of this embodiment, the Type-C subsystem may further comprise one or more standby references configured for use in applying Rp termination and in detection of Ra termination and Rd termination on a CC line, where the one or more standby references consume current in a range from 10 µA to 15 µA.

In an example embodiment, an apparatus comprises a USB Type-C subsystem. In some aspects the apparatus is a USB Type-C cable that comprises a USB Type-C plug with the Type-C subsystem being disposed therein, while in other aspects the apparatus comprises a Type-C receptacle with the Type-C subsystem being configured with respect to the receptacle. In this example embodiment, the Type-C subsystem comprises a gate control configured to control Ra termination, and a negative charge pump coupled to the gate control such that when enabled/activated, the negative charge pump is configured to disable the Ra termination. In some aspects of this embodiment, the Type-C subsystem may further comprise one or more standby references configured for use in applying Rp termination and in detection of Rp and Rd termination on a CC line of the Type-C subsystem.

In an example embodiment, a device is an integrated circuit (IC) chip that comprises a processor and a USB Type-C subsystem coupled thereto. In some form factors the device may be a USB Type-C cable that comprises a USB Type-C plug with the Type-C subsystem being disposed therein, while in other form factors the device may be disposed in an apparatus (e.g., such as a mobile device) that comprises a Type-C receptacle with the Type-C subsystem being configured with respect to the receptacle. In this embodiment, the Type-C subsystem is configured to: operate an Ra termination circuit coupled to a Vconn line of the Type-C subsystem, where the Ra termination circuit consumes no more than 100 µA of current (or more preferably, no more than 50 µA of current) after the Ra termination circuit has been applied to the Vconn line; and operate one or more standby reference circuits in a deep-sleep state of the device to perform detection on a CC line of the Type-C subsystem, where the device consumes no more than 100 µA of current (or more preferably, no more than 50 µA of current) in the deep-sleep state. In an example aspect of this embodiment, the Ra termination circuit comprises a resistor element coupled in series with a native device, where the Ra termination circuit is configured to remain "ON" while the Type-C subsystem is unpowered. In the same or a different aspect, in order to operate the Ra termination circuit, the Type-C subsystem is configured to: maintain the Ra termination circuit "ON" while the Type-C subsystem is unpowered; detect when the Vconn line is powered; and enable a negative charge pump when the Vconn line reaches above a threshold voltage, in order to disable the Ra termination circuit. In an example aspect of this embodiment, the Type-C subsystem is configured to transition from the deep-sleep state to an active state of the device when communication is detected on the CC line, and revert to the deep-sleep state when the CC line goes idle. In the same or a different aspect, the Type-C subsystem is configured to transition from the deep-sleep state to a waiting-for-attach state of the device when detachment of termination is detected on the CC line in the deep-sleep state.

In an example embodiment, an apparatus comprises a processor and a USB Type-C subsystem coupled thereto, where the Type-C subsystem is disposed in an integrated circuit (IC) chip. In some form factors, the apparatus may further comprise a Type-C receptacle with the Type-C subsystem being coupled and configured with respect to the receptacle. In this embodiment, the Type-C subsystem is configured to: enable one or more standby reference circuits in an active state of the IC chip, transition from the active state to a deep-sleep state of the IC chip, and operate the one or more standby reference circuits in the deep-sleep state to perform detection on CC lines of the Type-C subsystem, where in the deep-sleep state the IC chip consumes no more than 50 µA of current and/or the one or more standby reference circuits consume current in a range from 10 µA to 15 µA. In an example aspect of this embodiment, the Type-C subsystem may be further configured to enable a precise Rd termination detector or a precise Ra termination detector when attachment of termination is detected on one of the CC lines, and enable the one or more standby reference circuits after the attachment of termination is detected. In the same or a different aspect, the Type-C subsystem may be further configured to transition the IC chip from the deep-sleep state back to the active state when communication is detected on one of the CC lines, and revert to the deep-sleep state when the CC line goes idle. In the same or a different aspect, the Type-C subsystem may be further configured to transition the IC chip from the deep-sleep state to a waiting-for-attach state of the IC chip when detachment of termination is detected on one of the CC lines in the deep-sleep state. In the waiting-for-attach state, the Type-C system may be configured to consume no more than 2 µA of current. Further, in the waiting-for-attach state, the Type-C subsystem may be configured to wait for attachment of Rd termination or Ra termination on one of the CC lines and to transition the IC chip from the waiting-for-attach state to the active state when any of the Rd termination or the Ra termination is detected.

In an example embodiment, a method for reducing power consumed by a USB Type-C subsystem comprises: maintaining Ra termination "ON" while the Type-C subsystem is unpowered; detecting when a Vconn line of the Type-C subsystem is powered; and disabling the Ra termination by enabling a negative charge pump when the Vconn line reaches a threshold voltage. In an example aspect of this embodiment, detecting when the Vconn line is powered comprises: detecting an attach event on the Vconn line; deferring activation of circuits required by the Type-C subsystem after the attach event is detected and before the Vconn line reaches the threshold voltage; and activating the circuits required by the Type-C subsystem after the Vconn line reaches the threshold voltage. In this aspect, deferring activation of the circuits required by the Type-C subsystem is performed in a waiting-for-attach state, where in the waiting-for-attach state the Type-C subsystem is waiting for attachment of Rd termination or Ra termination on a CC line of the Type-C subsystem. In some aspects of this embodiment, the method for reducing power further comprises: enabling a respective precise Rd termination detector or a precise Ra termination detector when the attachment of the Rd termination or the Ra termination is detected; and enabling one or more standby references in a deep-sleep state, where in the deep-sleep state a total current consumed by the Type-C subsystem is equal to or less than 50 µA. In these aspects, the method may further comprise: transitioning from the deep-sleep state to an active state when communication is detected on the CC line, and reverting to the deep-sleep state when the CC line goes idle; and transitioning from the deep-sleep state to the waiting-for-attach state when detachment of the Rd termination or the Ra termination is detected in the deep-sleep state. In some aspects of this embodiment, the threshold voltage for the Vconn line is in a range from 2.375V to 2.625V. In these and/or other aspects, disabling the Ra termination is performed without placing the Type-C subsystem in an active state, where in the active state the Type-C subsystem consumes a total current of at least 1 mA.

FIG. 1A illustrates an example device 100 that is configured in accordance with the techniques for low-power USB Type-C subsystems described herein. In the embodiment illustrated in FIG. 1A, device 100 is an integrated circuit (IC) controller chip manufactured on an IC die. For example, IC controller 100 may be a single-chip IC device from a family of USB controllers developed by Cypress Semiconductor Corporation, San Jose, Calif.

Among other components, IC controller 100 includes CPU subsystem 102, peripheral interconnect 114, system resources 116, various input/output (I/O) blocks (e.g., 118A-118C), and USB subsystem 120. In addition, IC controller 100 provides circuitry and firmware that is configured and operable to support a number of power states 122.

CPU subsystem 102 includes one or more CPUs (central processing units) 104, flash memory 106, SRAM (Static Random Access Memory) 108, and ROM (Read Only Memory) 110 that are coupled to system interconnect 112. CPU 104 is a suitable processor that can operate in a system-on-chip device. In some embodiments, the CPU may be optimized for low-power operation with extensive clock gating and may include various internal controller circuits that allow the CPU to operate in various power states. For example, the CPU may include a wake-up interrupt controller that is configured to wake the CPU from a deep-sleep state, thereby allowing power to be switched off when the IC chip is in the deep-sleep state. Flash memory 106 can be any type of program memory (e.g., NAND flash, NOR flash, etc.) that is configurable for storing data and/or programs. SRAM 108 can be any type of volatile or non-volatile memory that is suitable for storing data and firmware/software instructions accessed by CPU 104. ROM 110 can be any type of suitable storage that is configurable for storing boot-up routines, configuration parameters, and other system-on-chip firmware. System interconnect 112 is a system bus (e.g., a single-level or multi-level Advanced High-Performance Bus, or AHB) that is configured as an interface that couples the various components of CPU subsystem 102 to each other, as well as a data and control interface between the various components of the CPU subsystem and peripheral interconnect 114.

Peripheral interconnect 114 is a peripheral bus (e.g., a single-level or multi-level AHB) that provides the primary data and control interface between CPU subsystem 102 and its peripherals and other resources, such as system resources 116, I/O blocks (e.g., 118A-118C), and USB subsystem 120. The peripheral interconnect may include various controller circuits (e.g., direct memory access, or DMA controllers), which may be programmed to transfer data between peripheral blocks without burdening the CPU subsystem. In various embodiments, each of the components of the CPU subsystem and the peripheral interconnect may be different with each choice or type of CPU, system bus, and/or peripheral bus.

System resources 116 include various electronic circuits that support the operation of IC controller 100 in its various states and modes. For example, system resources 116 may include a power subsystem that provides the power resources required for each controller state/mode such as, for example, voltage and/or current references, wake-up interrupt controller (WIC), power-on-reset (POR), etc. In some embodiments, the power subsystem of system resources 116 may also include circuits that allow IC controller 100 to draw power from external sources with several different voltage levels. System resources 116 may also include a clock subsystem that provides various clocks that are used by IC controller 100, as well as circuits that allow various controller functions such as external reset.

An IC controller, such as IC controller 100, may include various different types of I/O blocks and subsystems in various embodiments and implementations. For example, in the embodiment illustrated in FIG. 1A, IC controller 100 includes GPIO (general purpose input output) blocks 118A, TCPWM (timer/counter/pulse-width-modulation) blocks 118B, SCBs (serial communication blocks) 118C, and USB subsystem 120. GPIOs 118A include circuits configured to implement various functions such as, for example, pull-ups, pull-downs, input threshold select, input and output buffer enabling/disabling, multiplex signals connected to various I/O pins, etc. TCPWMs 118B include circuits configured to implement timers, counters, pulse-width modulators, decoders and various other analog/mixed signal elements that are configured to operate on input/output signals. SCBs 118C include circuits configured to implement various serial communication interfaces such as, for example, $I^2C$, SPI (serial peripheral interface), UART (universal asynchronous receiver/transmitter), etc.

USB subsystem 120 is a Type-C subsystem configured in accordance with the techniques described herein, and may also provide support for USB communications over USB ports (e.g., such as USB 2.0, USB 3.0, USB 3.1, etc.) as well other USB functionality such as power delivery and battery charging. USB subsystem 120 includes Type-C transceiver 120A and physical layer logic 120B. Type-C transceiver 120A and PHY 120B are configured as an integrated baseband PHY circuit to perform various digital encoding/decoding functions (e.g., biphase mark coding, or BMC, cyclical redundancy checks, or CRC, among others) and analog signal processing functions involved physical layer transmissions. USB subsystem 120 is configured with the termination circuits required for identifying the role of IC controller 100 in Type-C operations, in accordance with the techniques described herein. For example, in some embodiments USB subsystem 120 includes: Ra termination circuit that is configured to identify IC controller 100 as a Vconn-powered accessory or an electronically marked cable; Rd termination circuit that is configured to identify IC controller 100 as a UFP application (e.g., in a hybrid cable or a dongle); and Rp termination circuit configured to identify IC controller 100 as a DFP application and to use current sources that can be programmed to indicate the complete range of current capacity on a VBUS line defined in a USB Type-C Specification. In addition, in these and/or other embodiments, IC controller 100 (and/or the USB subsystem 120 thereof) may be configured to respond to communications defined in a USB Power Delivery (USB-PD) Specification such as, for example, SOP, SOP', and SOP" messaging.

USB subsystem 120 includes circuitry that is configured to operate in accordance with the low-power techniques described herein. In some embodiments, USB subsystem 120 includes a gate control configured to control an Ra termination circuit and a negative charge pump coupled to the gate control such that when enabled/activated, the negative charge pump is configured to disable the Ra termination circuit. By design, the Ra termination circuit is enabled (e.g., "ON") when IC controller 100 is not powered. When power is applied on the Vconn line of USB subsystem 120, the Ra termination circuit remains enabled (e.g., "ON") while the voltage on the Vconn line remains below a threshold voltage (e.g., such as 2.5V). When the voltage on the Vconn line surpasses the threshold voltage, control circuitry in USB subsystem 120 enables the negative charge pump, which in turn disables the Ra termination via the gate control, thereby reducing the power used by the USB subsystem and IC controller 100.

In these and/or other embodiments, USB subsystem 120 may also include standby reference sources coupled to voltage threshold detectors on the CC/Vconn lines in order to implement several power states 122 for IC controller 100. Power states 122 include an active state (e.g., in which the IC controller consumes at least 1 mA of current, and often approximately 5 mA of current) and a sleep state (which differs from the active state in terms of the number of clocks that are running). In accordance with the techniques described herein, power states 122 also include the following low-power states: a deep-sleep state (in which the IC controller consumes 50 µA of current, or less), and a waiting-for-attach state (e.g., in which the IC controller consumes 2 µA of current, or less). For example, USB subsystem 120 is configured to keep IC controller 100 in the waiting-for-attach state when waiting for an attach event on the CC lines (or when the voltage on the Vconn line has not reached a threshold level), to transition the IC controller to the active/sleep state when the Ra or Rd termination circuit is enabled to detect the type of attached termination, to transition to the deep-sleep state after detection based on the Ra/Rd termination circuit is completed, and to transition back to the waiting-for-attach state when the Ra/Rd termination circuit is disconnected.

FIG. 1B illustrates example operational contexts in which the described techniques for low-power Type-C subsystems may be implemented. In each of these operational contexts, an IC controller (such as IC controller 100 of FIG. 1A) can be disposed and configured in a USB-enabled device in accordance with the techniques described herein. Referring to FIG. 1B, in one example embodiment a USB controller 100A may be disposed and configured in a computing device (e.g., laptop computer 130) as a DFP or DRP USB application. In another example embodiment, a USB controller 100B may be disposed and configured in an electronic device (e.g., monitor 140) as a DFP or DRP USB application. In yet another example embodiment, a USB controller 100C may be disposed and configured in a networking device (e.g., hub 150) as a UFP USB application. In yet another example embodiment, a USB controller 100D and (possibly) a USB controller 100E may be disposed and configured within one (or both) plugs of Type-C cable 160 as an EMCA application.

Figure 2B:
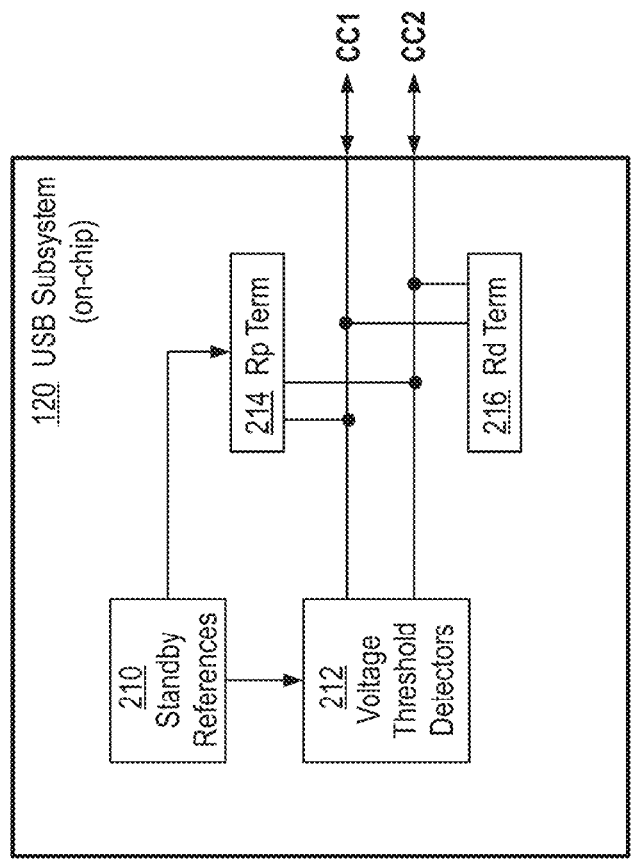
FIG. 2B illustrates a standby reference circuit in an example on-chip USB Type-C subsystem, according to some embodiments.
Figure 2A:
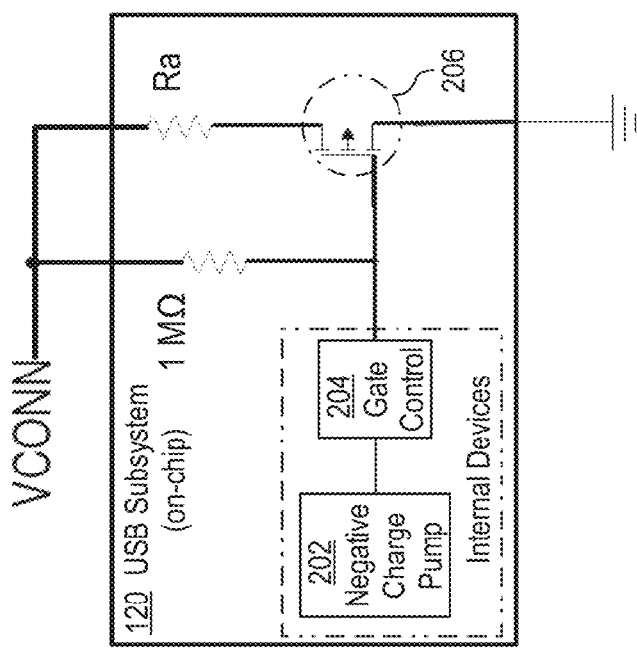
FIG. 2A illustrates an Ra termination circuit in an example on-chip USB Type-C subsystem, according to some embodiments.

FIG. 2A illustrates an Ra termination circuit in an example on-chip USB Type-C subsystem that may be disposed in an USB controller, such as IC controller 100 in FIG. 1A. In the example embodiment of FIG. 2A, the IC controller and its Type-C subsystem 120 may be disposed within a cable and configured as an EMCA (cable) application in accordance with the techniques described herein.

In FIG. 2A, USB Type-C subsystem 120 is part of an IC controller chip manufactured on an IC die. Type-C subsystem 120 includes an on-chip Ra termination circuit that is coupled to a CC/Vconn line. In operation, one of the CC lines in Type-C subsystem 120 is connected to establish signal orientation and the other CC line is repurposed as a Vconn line for powering the USB controller and the Type-C subsystem therein. Thus, although not illustrated in FIG. 2A, Type-C subsystem 120 may include two Ra termination circuits, each coupled to a separate one of the CC/Vconn lines. The Ra termination circuit in FIG. 2A includes Ra resistor element (e.g., ~1KΩ) that is coupled in series with native on-chip device 206. A resistor element with relatively high impedance (e.g., ~1 MΩ) is coupled between the CC/Vconn line and the gate(s) of native device 206. Native device 206 is an on-chip electronic circuit that may include one or more native NMOS transistors and other on-chip elements. Native device 206 has zero or near zero threshold voltage—e.g., the native device is turned on even when its gate is coupled to ground. According to the techniques described herein, the gate of native device 206 is coupled to gate control 204, which is an electronic circuit comprising electronic elements (e.g., diodes, transistors, switches, etc.) that are configured to apply a control function. Gate control 204 is coupled to negative charge pump 202. Negative charge pump 202 is an electronic circuit configured to create a sub-zero (e.g., negative) voltage power source.

Native device 206 is configured such that the Ra termination circuit is kept enabled ("ON") when Type-C subsystem 120 is not powered. The coupling of the gate of native device 206 to the CC/Vconn line through a high-impedance resistor element ensures that the voltage on the gate is zero or near zero when Type-C subsystem 120 is not powered (and/or when the voltage on the Vconn line is below a certain threshold), which causes native device 206 to conduct and effectively apply the Ra pull-down resistance on the CC/Vconn line. When Type-C subsystem 120 is powered through the Vconn line and the voltage thereon reaches a threshold voltage, a firmware interrupt is generated to enable negative charge pump 202. When activated, negative charge pump 202 applies a negative voltage on the gate of native device 206 via gate control 204. The negative voltage on its gate turns off native device 206, thereby disabling the Ra termination coupled to the Vconn line and effectively reducing the power used by the USB controller and the Type-C subsystem 120 thereof. When the power on the Vconn line is removed (e.g., when the Vconn line is detached/disconnected), negative charge pump 202 is turned off and the voltage on the gate of native device 206 returns to zero or near zero, thereby turning on the native device and effectively enabling the Ra termination on the Vconn line.

It is noted that according to the low-power techniques described herein, all of the components (e.g., negative charge pump 202, gate control 204, native device 206, Ra and high-impedance resistor elements, etc.) of the Ra termination circuit in FIG. 2A are internal, on-chip components. Further, by disabling the Ra termination circuit in FIG. 2A, the techniques described herein reduce the current consumed by the Ra termination to less than 50 µA. This is in contrast with conventional implementations of Ra termination circuits, which typically use external, off-chip components (e.g., such as enable/disable pins, precise resistors, capacitors, etc.) that keep the Ra termination turned on while the USB controller and the USB Type-C subsystem thereof are powered and thereby consume at least 5 mA of current. Thus, the techniques described herein provide for about twenty times (20×) improvement on current/power consumption by the USB controller and the Type-C system thereof.

FIG. 2B illustrates an example on-chip USB Type-C subsystem that may be disposed in an USB controller such as IC controller 100 in FIG. 1A. In the example embodiment of FIG. 2B, the IC controller and its Type-C subsystem 120 may be disposed and configured as a DFP or DRP application in accordance with the techniques described herein. In FIG. 2B, Type-C subsystem 120 is part of an IC controller chip (not shown) manufactured on an IC die.

In accordance with the techniques described herein, Type-C subsystem 120 includes standby references 210 that are used to implement detection and termination on the CC lines of Type-C subsystem 120. Standby references 210 are precise, low-power voltage and/or current reference sources that may consume from 10 µA to 15 µA of current. Standby references 210 are coupled to voltage threshold detectors 212, Rp termination circuit 214, and Rd termination circuit 216. Voltage threshold detectors 212 are electronic circuits coupled to, and configured to detect the voltage levels on, the CC lines (CC1 and CC2) of Type-C subsystem 120. Rp termination circuit 214 is coupled to the CC lines of Type-C subsystem 120 and is used for host device identification when the Type-C subsystem (and its USB controller) is disposed in a device as a DFP or DRP application. Rd termination circuit 216 is coupled to the CC lines of Type-C subsystem 120 and is used for peripheral device identification when the Type-C subsystem (and its USB controller) is disposed in a device as a UFP application. In operation, standby references 210 are enabled by Type-C subsystem 120 when the USB controller enters a deep-sleep state. In the deep-sleep state, standby references 210 are configured to provide voltage/current references to voltage threshold detectors 212, Rp termination circuit 214 and/or Rd termination circuit 216 without having to power the USB controller into an active state. This allows Type-C subsystem 120 to perform Rp termination and attach/detach detection on the CC lines without causing the USB controller to consume power in an active state.

It is noted that according to the low-power techniques described herein, the standby references 210 in FIG. 2B are precise voltage and/or current reference sources that draw very low amount of current (e.g., in the range of 10 µA to 15 µA). This is in contrast with conventional implementations of Type-C detection and termination, which typically keep the USB controller in the active mode (thereby causing increased power consumption) and use active references that consume a relatively large amount of current (e.g., about 1 mA, or more).

Figure 3:
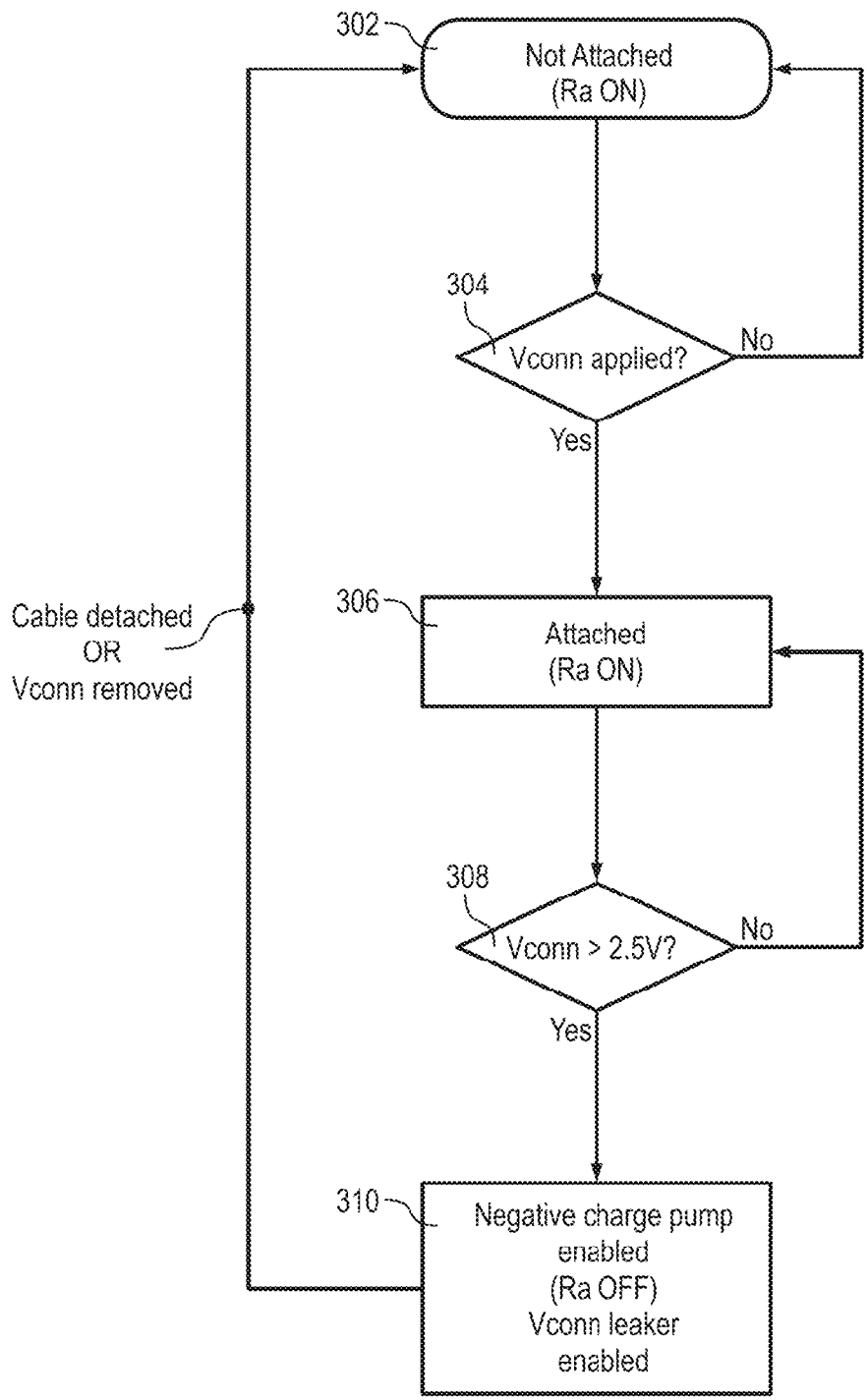
FIG. 3 illustrates an example method for disabling Ra termination in a Type-C subsystem, according to some embodiments.

FIG. 3 is a flow diagram illustrating an example method for disabling Ra termination in a Type-C subsystem configured as an EMCA (cable) application, in accordance with the techniques described herein. The operations of the method in FIG. 3 are described as being performed by a controller (e.g., a USB controller) and/or circuits (e.g., a USB Type-C subsystem) thereof, in accordance with an example embodiment. It is noted, however, that various implementations and embodiments may use various, and possibly different, components to perform the operations of the method in FIG. 3. For example, in various embodiments a system-on-chip device may be configured with firmware instructions which, when executed by one or more processors or other hardware components (e.g., microcontrollers, ASICs, and the like), are operable to perform the operations of the method in FIG. 3. In another example, in various embodiments an IC device may include a single-chip or multi-chip controller configured to perform the operations of the method in FIG. 3. Thus the description hereinafter, of the method in FIG. 3 as being performed by a controller and/or circuits thereof, is to be regarded in an illustrative rather than a restrictive sense.

In operation 302, a controller (and/or a Type-C subsystem thereof) is disposed in a cable and is not powered. In this unpowered state, Ra termination is maintained "ON" in accordance with the techniques described herein. The controller stays in the unpowered state for as long as power is not applied thereto, which may be determined in operation 304.

In operation 304, the controller (repeatedly) determines whether the cable is powered. For example, the controller (and/or the Type-C subsystem thereof) determines whether voltage is applied on the Vconn line of the Type-C subsystem. If in operation 304 it is determined that voltage is not applied to the Vconn line, the controller returns to the unpowered state (e.g., per operation 302). If in operation 304 it is determined that voltage is applied to the Vconn line, then the controller (and/or the Type-C subsystem thereof) proceeds with operation 306.

In operation 306, the controller (and/or the Type-C subsystem thereof) determines that the cable is attached to a power source (e.g., which happens when the cable is plugged into a receptacle). For example, the controller (and/or the Type-C subsystem thereof) determines that power is supplied on the Vconn line and the Ra termination is still maintained "ON", while operation 308 is being performed.

In operation 308, the controller determines whether the voltage on the Vconn line has reached a threshold level. For example, the controller (and/or the Type-C subsystem thereof) determines whether the voltage on the Vconn line has reached above 2.5V. If in operation 308 it is determined that the voltage on the Vconn line has not reached above 2.5V, the Ra termination is maintained "ON" and the controller (and/or the Type-C subsystem thereof) returns to the attached state (e.g., per operation 306). If in operation 308 it is determined that the voltage on the Vconn line has reached above 2.5V, then the controller (and/or the Type-C subsystem thereof) proceeds with operation 310.

In operation 310, the voltage on the Vconn line has reached above 2.5V and the controller (and/or the Type-C subsystem thereof) generates a firmware interrupt to enable a negative charge pump that is coupled to the Ra termination circuit. Enabling/activating the negative charge pump disables the Ra termination, thereby reducing the current (and therefore power) consumed by the controller and the Type-C subsystem thereof. In some embodiments, when the Ra termination is turned "OFF", a leaker circuit coupled to the Vconn may also be enabled/activated in order to meet the Vconn discharge requirements in the USB Type-C Specification(s). In such embodiments, the leaker circuit may be programmable in order to provide additional power savings. For example, the leaker circuit level may be determined and dynamically programmed based on the amount of decoupling capacitance present on the Vconn line at the controller (system) level.

After operation 310 is completed, the Ra termination is maintained "OFF" so long as power is provided on the Vconn line. The power to the controller (and/or the Type-C subsystem thereof) is removed when the cable is detached or the Vconn line is disconnected or otherwise removed. In this case, the negative charge pump is turned off, which enables the Ra termination and the controller (and/or the Type-C subsystem thereof) goes back to the unpowered state (e.g., per operation 302).

In this manner, the techniques for low-power described herein allow the controller and the USB Type-C subsystem thereof to save at least 1 mA of current as compared to some conventional implementations. For example, in some embodiments the current used by the controller (and/or the Type-C subsystem thereof) may go from 1 mA to less than 50 µA—a 20× improvement, while in other embodiments the used current may go from 5 mA down to 50 µA or less for an improvement of almost 100×.

Figure 4:
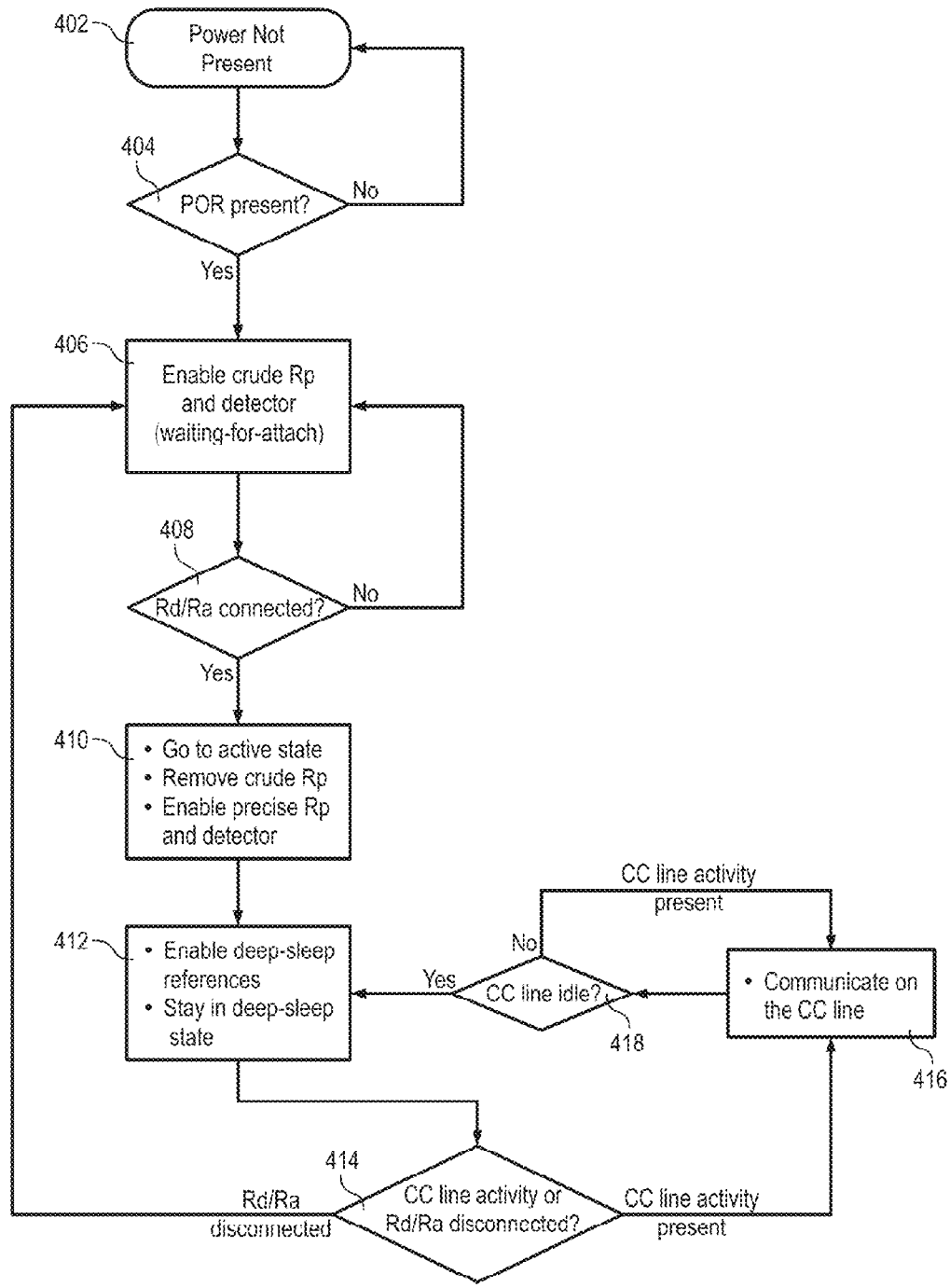
FIG. 4 illustrates an example method for using standby references in a Type-C subsystem, according to some embodiments.

FIG. 4 is a flow diagram illustrating an example method for using standby references in a USB Type-C subsystem configured as a DFP or DRP (e.g., host-based) application, in accordance with the techniques described herein. The operations of the method in FIG. 4 are described as being performed by a controller (e.g., a USB controller) and/or circuits (e.g., a USB Type-C subsystem) thereof, in accordance with an example embodiment. It is noted, however, that various implementations and embodiments may use various, and possibly different, components to perform the operations of the method in FIG. 4. For example, in various embodiments a system-on-chip device may be configured with firmware instructions which, when executed by one or more processors or other hardware components (e.g., microcontrollers, ASICs, and the like), are operable to perform the operations of the method in FIG. 4. In another example, in various embodiments an IC device may include a single-chip or multi-chip controller configured to perform the operations of the method in FIG. 4. Thus the description hereinafter, of the method in FIG. 3 as being performed by a controller and/or circuits thereof, is to be regarded in an illustrative rather than a restrictive sense.

In operation 402, a controller (and/or a Type-C subsystem thereof) is configured in a USB-enabled host device and is not powered. In this unpowered state, Rd termination may be present but not applied. The controller (and/or the Type-C subsystem thereof) remains in this unpowered state for as long as power is not applied thereto, which may be determined in operation 404.

In operation 404, the controller (repeatedly) determines whether a power-on-reset (POR) signal is applied thereto. If in operation 404 it is determined that a POR signal is not applied, the controller returns to and remains in the unpowered state (e.g., per operation 402). If in operation 404 it is determined that a POR signal is applied, then the controller (and/or the Type-C subsystem thereof) proceeds with operation 406.

In operation 406, when POR is present or once power is applied to the controller and/or the Type-C subsystem thereof, the controller enables crude Rp termination circuits (e.g., circuits that apply Rp termination based on custom predetermined threshold(s) by using minimum amount of power), turns on crude Rd/Ra attach detector circuits (e.g., circuits that detect Rd/Ra attach events based on a single threshold by using minimum amount of power), and waits to detect an Rd or Ra attach event on the CC line. According to the techniques described herein, this state is called "waiting-for-attach" state, in which the controller (and/or the Type-C subsystem thereof) is waiting for an attachment event on the CC line. For example, in the waiting-for-attach state the controller (and/or the Type-C subsystem thereof) may repeatedly perform operation 408 to detect the attachment of Rd termination or Ra termination. The waiting-for-attach state is a low-power state in which the controller consumes total current of approximately 2 µA.

In operation 408, the controller (and/or the Type-C subsystem thereof) determines whether an Rd termination circuit or an Ra termination circuit is connected/applied on the CC line of the Type-C subsystem. If in operation 408 it is determined that Rd termination or Ra termination is not connected/applied, the controller (and/or the Type-C subsystem thereof) returns to the waiting-for-attach state (e.g., per operation 406). If in operation 408 it is determined that Rd termination or Ra termination is connected or applied, the controller (and/or the Type-C subsystem thereof) proceeds with operation 410.

In operation 410, the controller (and/or the Type-C subsystem thereof) performs actions that are normally performed in an active state in accordance with the USB Type-C specification(s). For example, once any of Rd termination or Ra termination is connected/applied to the CC line, the controller (and/or the Type-C subsystem thereof) transitions from the waiting-for-attach state into an active state. In the active state, the controller (and/or the Type-C subsystem thereof) enables the deep-sleep standby references and applies precise Rp termination in order to identify the host device on the CC line. In addition, in accordance with the techniques described herein the controller (and/or the Type-C subsystem thereof) may enable a respective precise Rd termination or Ra termination detector circuit (e.g., such as circuits that detect Rd or Ra attach events based on multiple thresholds), and then proceeds with operation 412.

In operation 412, the deep-sleep standby references have been enabled (e.g., while in the active state) and configured to operate in accordance with the techniques described herein. For example, in an example embodiment a precise standby voltage reference may be configured to generate a reference voltage of 0.74V and a precise standby current reference may be configured to generate a reference current of 2.4 μA. After the deep-sleep standby references have been enabled, the controller transitions from the active state into a deep-sleep state, in which the controller and/or its circuits consume less than 50 μA of current. The controller (and/or the Type-C subsystem thereof) remains in the deep-sleep state until one of two events happen, as determined in operation 414.

In operation 414, the controller (and/or the Type-C subsystem thereof) determines whether: (1) the Rd termination or the Ra termination has been disconnected from the CC line, and/or (2) whether activity (e.g., communication in the form of send or receive packets) is present on the CC line. If in operation 414 it is determined that the (previously connected) Rd termination or Ra termination has been disconnected (e.g., a detach event on the CC line), the controller (and/or the Type-C subsystem thereof) transitions from the deep-sleep state back to the waiting-for-attach state and enables the crude Rp termination circuits and the crude Rd/Ra attach detector circuits (e.g., per operation 406). If in operation 414 it is determined that there is communication activity on the CC line, the controller (and/or the Type-C subsystem thereof) proceeds with operation 416.

In operation 416, the controller (and/or the Type-C subsystem thereof) transitions from the deep-sleep state to the active state and performs any actions necessary for communicating on the CC line for as long as the line activity continues, which may be (repeatedly) determined in operation 418. In operation 418, the controller (and/or the Type-C subsystem thereof) determines whether the CC line is idle. If in operation 418 it is determined that the CC line is not idle, the controller remains in the active state to support communication on the CC line (e.g., per operation 416). If in operation 418 it is determined that the CC line has gone idle, the controller (and/or the Type-C subsystem thereof) proceeds with operation 412 to transition from the active state to the deep-sleep state. For example, when it detects that the CC line has gone idle, the controller (and/or the Type-C subsystem thereof) enables the standby references and transitions to the deep-sleep state.

In this manner, the techniques for low-power described herein allow the controller and the USB Type-C subsystem thereof to avoid using active voltage and/or current references that may consume a relatively large amount of current (e.g., ~1 mA). In comparison, according to the techniques described herein the standby references consume less than 15 μA of current in the deep-sleep state, which is a close to 60× improvement in current consumption. In addition, without the new waiting-for-attach state, the total current consumption by the controller may be 50 μA or more while waiting to detect an attach event on the CC line. In comparison, according to the techniques described herein the total current consumed by the controller in the waiting-for-attach state is approximately 2 μA, which is about a 25× improvement.

Figure 5B:
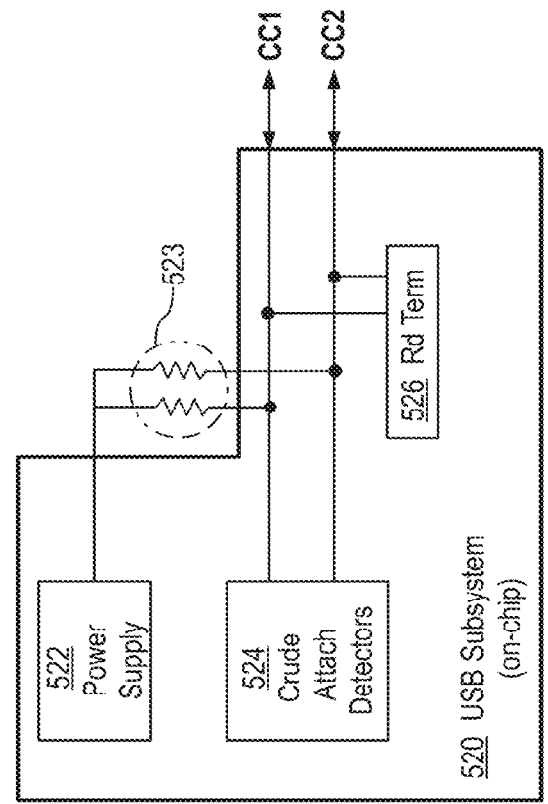
FIG. 5B illustrates a precision resistors circuit in an example on-chip USB Type-C subsystem, according to some embodiments.
Figure 5A:
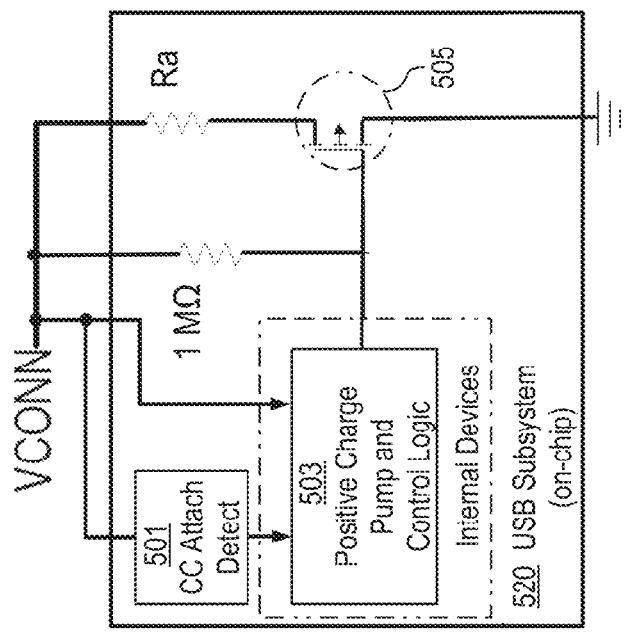
FIG. 5A illustrates an Ra termination circuit in an example on-chip USB Type-C subsystem, according to some embodiments.

FIG. 5A illustrates an Ra termination circuit in an example on-chip USB Type-C subsystem that may be disposed in an USB controller, such as IC controller 100 in FIG. 1A. The Ra termination circuit in the alternative embodiment of FIG. 5A performs similar disable function as the Ra termination circuit in FIG. 2A, except that a positive charge pump and a regular switching device are used. In the alternative embodiment of FIG. 5A, the IC controller and its Type-C subsystem 520 may be disposed within a cable and configured as an EMCA (cable) application in accordance with the techniques described herein.

Referring to FIG. 5A, USB Type-C subsystem 520 is part of an IC controller chip manufactured on an IC die. Type-C subsystem 520 includes an on-chip Ra termination circuit that is coupled to the CC lines of the subsystem. The Ra termination circuit in FIG. 5A includes Ra resistor element (e.g., ~1KΩ) that is coupled in series with device 505. A resistor element with relatively high impedance (e.g., ~1 MΩ) is coupled between the CC/Vconn lines and the gate of device 505. Device 505 is a switching circuit that has positive threshold voltage. The gate of device 505 is coupled to logic 503, which includes electronic circuits configured to provide a control function and a positive charge pump. The positive charge pump is an electronic circuit configured to create a positive voltage power source. Logic 503 is coupled to the CC lines of Type-C subsystem 520 and to detection circuit 501. Detection circuit 501 is coupled to the CC lines and is configured to detect an attach event on any of the CC lines.

In operation, detection circuit 501 detects a voltage pull-up on one of the CC lines and enables the positive charge pump in logic 503, where the positive charge pump is powered by the voltage on the CC line. When enabled/powered, the positive charge pump and the control in logic 503 enable switching device 505. When device 505 is enabled, the Ra termination circuit is turned on and is detected (e.g., by a host device) on the other CC line (which is repurposed as the Vconn line). It is noted that once the Ra termination is enabled, the voltage on first CC line can go below 0.2V and the positive charge pump may not remain operational. To circumvent this problem, the voltage pumped by the positive charge pump needs to be stored (e.g., buffered) long enough so that a host device coupled on the CC line can detect the Ra termination and apply voltage on the Vconn line. Once the Vconn line is applied and detected, logic 503 disables the positive charge pump, which pulls the gate of device 505 to ground thereby turning off the device and disabling the Ra termination circuit in order to save power.

FIG. 5B illustrates an example on-chip USB Type-C subsystem that may be disposed in an USB controller such as IC controller 100 in FIG. 1A. In the alternative embodiment of FIG. 5B, the IC controller and its Type-C subsystem 520 may be disposed and configured as a DFP or DRP application in accordance with the techniques described herein. In FIG. 5B, Type-C subsystem 520 is part of an IC controller chip (not shown) manufactured on an IC die.

In accordance with the techniques described herein, Type-C subsystem 520 includes power supply 522. Power supply 522 is coupled through external, off-chip high-precision resistors 523 to the CC lines (CC1 and CC2) of Type-C subsystem 520. Power supply 522 is also coupled to crude attach detectors 524. Crude attach detectors 524 are coupled though Rd termination circuit 526 to the CC lines (CC1 and CC2) of Type-C subsystem 520 and are configured to detect the voltage levels on the CC lines (e.g., by using a single voltage threshold). In operation, the circuits illustrated in FIG. 5B are configured to reduce current consumption by implementing the waiting-for-attach state described heretofore. For example, power supply 522, high-precision resistors 523, and crude attach detectors 524 may be used to detect attach events on the CC lines.

In some embodiments, the techniques for low-power USB Type-C subsystems described herein provide for implementing Ra termination by using a native device along with a negative charge pump. This may reduce the total current consumed by the Ra termination circuit from about 5 mA (e.g., as may be used in conventional implementations) to less than 50 μA. In these and/or other embodiments, the techniques described herein may also provide precise standby reference circuits that are used in a deep-sleep state to perform termination and attach/detach detection on the CC lines of the Type-C subsystem without causing the USB controller to consume power in an active state but still meeting the precision voltage/current requirements. This may reduce the total current consumed by an IC (controller) in the deep-sleep state from more than 1 mA (e.g., as may be used in conventional implementations) to approximately 50 µA, where the standby references themselves may consume from 10 µA to 15 µA of current. In these and/or other embodiments, the techniques described herein may also provide a new waiting-for-attach state, in which the Type-C subsystem is waiting for an attach event on the CC line when configured in a DFP or DRP application. This may reduce the current consumed by an IC (controller) while waiting for an attach event (e.g., when the Type-C port provided by the controller is not attached to anything) from about 50 µA (e.g., as may be used in conventional implementations) to approximately 2 µA.

Various embodiments of the techniques for low-power USB Type-C subsystems described herein may include various operations. These operations may be performed and/or controlled by hardware components, digital hardware and/or firmware, and/or combinations thereof. As used herein, the term "coupled to" may mean coupled directly or indirectly through one or more intervening components. Any of the signals provided over various on-die buses described herein may be time multiplexed with other signals and provided over one or more common on-die buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium, e.g., such as volatile memory and/or non-volatile memory. These instructions may be used to program one or more devices that include one or more general-purpose or special-purpose processors (e.g., such as CPUs) or equivalents thereof (e.g., such as processing cores, processing engines, microcontrollers, and the like), so that when executed by the processor(s) or the equivalents thereof, the instructions cause the device(s) to perform the described operations for low-power USB subsystems described herein. A computer-readable medium may also include one or more mechanisms for storing or transmitting information in a form (e.g., software, processing application, etc.) that is readable by a machine (e.g., such as a device or a computer). The non-transitory computer-readable storage medium may include, but is not limited to, electromagnetic storage medium (e.g., floppy disks, hard disks, and the like), optical storage medium (e.g., CD-ROM), magneto-optical storage medium, read-only memory (ROM), random-access memory (RAM), erasable programmable memory (e.g., EPROM and EEPROM), flash memory, or another now-known or later-developed non-transitory type of medium that is suitable for storing information.

Although the operations of the method(s) herein are shown and described in a particular order, in some embodiments the order of the operations of each method may be altered so that certain operations may be performed in an inverse order or so that certain operation may be performed, at least in part, concurrently and/or in parallel with other operations. In other embodiments, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A device comprising:
    a processor; and
    a Universal Serial Bus (USB) Type-C subsystem, wherein the Type-C subsystem is configured at least to:
        operate an Ra termination circuit coupled to a Vconn line of the Type-C subsystem, wherein the Ra termination circuit consumes no more than 100 µA of current after being applied to the Vconn line; and
        operate one or more standby reference circuits in a deep-sleep state of the device to perform detection on a Configuration Channel (CC) line of the Type-C subsystem, wherein the device consumes no more than 100 µA of current in the deep-sleep state;
    wherein to operate the Ra termination circuit, the Type-C subsystem is configured to:
        maintain the Ra termination circuit "ON" while the Type-C subsystem is unpowered;
        detect when the Vconn line is powered; and
        enable a negative charge pump when the Vconn line reaches above a threshold voltage, in order to disable the Ra termination circuit;
    wherein the device is an integrated circuit (IC) chip.

2. The device of claim 1, wherein the Ra termination circuit comprises a resistor element coupled to a native device, and wherein the Ra termination circuit is configured to remain "ON" while the Type-C subsystem is unpowered.

3. The device of claim 1, wherein the Type-C subsystem is configured to transition from the deep-sleep state to an active state of the device when communication is detected on the CC line, and revert to the deep-sleep state when the CC line goes idle.

4. The device of claim 1, wherein the Type-C subsystem is configured to transition from the deep-sleep state to a waiting-for-attach state of the device when detachment of termination is detected on the CC line in the deep-sleep state.

5. A device comprising:
    a processor; and
    a Universal Serial Bus (USB) Type-C subsystem comprising a negative charge pump and an Ra termination circuit, wherein the negative charge pump is coupled to the Ra termination circuit and the Ra termination circuit is coupled to a Vconn line of the Type-C subsystem;
    wherein the Type-C subsystem is configured to:
        enable the negative charge pump when voltage on the Vconn line reaches above a threshold voltage; and
        disable the Ra termination circuit when the negative charge pump is enabled;
        wherein the Ra termination circuit is configured to consume no more than 100 µA of current after being disabled;
    wherein the device is an integrated circuit (IC) chip.

6. The device of claim 5, wherein the Ra termination circuit includes a native on-chip device coupled to the negative charge pump, the Ra termination circuit being configured to consume no more than 50 µA of current after being disabled.

7. The device of claim 5, wherein the Type-C subsystem is configured to maintain the Ra termination circuit "ON" while the Type-C subsystem is unpowered.

8. The device of claim 5, wherein the threshold voltage is in a range from 2.375V to 2.625V.

9. The device of claim 5, wherein the Type-C subsystem is further configured to:
  detect when the voltage on the Vconn line is no longer applied; and
  disable the negative charge pump in order to enable the Ra termination circuit.

10. The device of claim 5, wherein the device is a cable.

11. An apparatus comprising:
  a processor; and
  a Universal Serial Bus (USB) Type-C subsystem comprising one or more standby reference circuits, wherein the Type-C subsystem is disposed in an integrated circuit (IC) chip and is configured to:
    enable the one or more standby reference circuits in an active state of the IC chip;
    transition from the active state to a deep-sleep state of the IC chip;
    operate the one or more standby reference circuits in the deep-sleep state to perform detection on Configuration Channel (CC) lines of the Type-C subsystem, wherein the IC chip is configured to consume no more than 100 µA of current in the deep-sleep state;
    enable a precise Rd termination detector or a precise Ra termination detector when attachment of termination is detected on one of the CC lines; and
    enable the one or more standby reference circuits after the attachment of termination is detected.

12. The apparatus of claim 11, wherein the Type-C subsystem is further configured to transition the IC chip from the deep-sleep state back to the active state when communication is detected on one of the CC lines, and revert to the deep-sleep state when the one of the CC lines goes idle.

13. The apparatus of claim 11, wherein the Type-C subsystem is further configured to transition the IC chip from the deep-sleep state to a waiting-for-attach state of the IC chip when detachment of termination is detected on one of the CC lines in the deep-sleep state.

14. The apparatus of claim 13, wherein the Type-C system consumes no more than 2 µA of current in the waiting-for-attach state.

15. The apparatus of claim 13, wherein the Type-C subsystem is configured to wait for attachment of Rd termination or Ra termination on one of the CC lines in the waiting-for-attach state, and wherein the Type-C system is further configured to transition the IC chip from the waiting-for-attach state to the active state when any of the Rd termination or the Ra termination is detected.

16. The apparatus of claim 11, wherein the one or more standby reference circuits are configured to consume current in a range from 10 µA to 15 µA in the deep-sleep state.

17. The apparatus of claim 11, wherein the IC chip is configured to consume no more than 50 µA of current in the deep-sleep state.

18. The apparatus of claim 11, further comprising a USB Type-C receptacle that is coupled to the Type-C subsystem.

* * * * *